(12) United States Patent
Sacchet et al.

(10) Patent No.: US 12,320,486 B2
(45) Date of Patent: Jun. 3, 2025

(54) LIGHT MODULE INCLUDING AN ELEMENT WITH VARIABLE LIGHT TRANSMISSION RATE

(71) Applicant: VALEO VISION, Bobigny (FR)

(72) Inventors: Dirkie Sacchet, Mesling (BE); Franck Dinant, Mesling (BE); Emeric Mudry, Mesling (BE); Florestan Debert, Mesling (BE)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/578,974

(22) PCT Filed: Jul. 11, 2022

(86) PCT No.: PCT/EP2022/069332
§ 371 (c)(1),
(2) Date: Jan. 12, 2024

(87) PCT Pub. No.: WO2023/285388
PCT Pub. Date: Jan. 19, 2023

(65) Prior Publication Data
US 2024/0318802 A1    Sep. 26, 2024

(30) Foreign Application Priority Data
Jul. 12, 2021  (FR) .................... 2107568

(51) Int. Cl.
*F21S 41/43*  (2018.01)
*F21S 41/143*  (2018.01)
(Continued)

(52) U.S. Cl.
CPC ............ *F21S 41/43* (2018.01); *F21S 41/143* (2018.01); *F21S 41/25* (2018.01); *F21W 2103/60* (2018.01)

(58) Field of Classification Search
CPC .......... F21S 41/43; F21S 41/143; F21S 41/25; F21W 2103/60
See application file for complete search history.

(56) References Cited

U.S. PATENT DOCUMENTS 7,455,439 B2   11/2008   Albou et al.
10,442,346 B2  10/2019   Tsai et al.
(Continued)

FOREIGN PATENT DOCUMENTS

EP   0149570 A1   7/1985
EP   1564482 A1   8/2005
(Continued)

OTHER PUBLICATIONS

European Search Report, International Search Report (with English translation) and Written Opinion of corresponding international application No. PCT/EP2022/069332 dated Sep. 5, 2022.
(Continued)

*Primary Examiner* — Elmito Breval
(74) *Attorney, Agent, or Firm* — Valeo Vision

(57) ABSTRACT

The invention relates to a luminous module for automotive vehicle including a light source and a projection optic designed to project a light field onto the ground. The luminous module also includes an element with a variable light transmission rate positioned between the light source and the projection optic, the element with a variable light transmission rate includes at least one first portion and at least one second portion. Each of these portions has a different light transmission rate so that the image sectors respectively formed by the first portion and the second portion have the same luminous intensity.

20 Claims, 6 Drawing Sheets

(51) Int. Cl.
*F21S 41/25* (2018.01)
*F21W 103/60* (2018.01)

(56) References Cited

U.S. PATENT DOCUMENTS

| | | | |
|---|---|---|---|
| 10,976,619 | B2 | 4/2021 | Watanabe et al. |
| 11,005,017 | B2 | 5/2021 | Crompvoets et al. |
| 11,215,337 | B2 | 1/2022 | Lee et al. |
| 11,235,700 | B2 | 2/2022 | Brill et al. |
| 11,719,407 | B2 | 8/2023 | Okubo |
| 2005/0180154 | A1 | 8/2005 | Albou et al. |
| 2021/0123578 | A1 | 4/2021 | Schadenhofer et al. |

FOREIGN PATENT DOCUMENTS

| | | | |
|---|---|---|---|
| EP | 2247098 | A1 | 3/2010 |
| EP | 3279135 | A1 | 2/2018 |
| FR | 3062613 | A1 | 8/2018 |
| JP | 2010260380 | A | 11/2010 |
| JP | 2012042610 | A | 3/2012 |
| JP | 2017527119 | A | 9/2017 |
| JP | 2020087541 | A | 6/2020 |
| KR | 20130101734 | A | 9/2013 |

OTHER PUBLICATIONS

Japan Patent Office, Office Action (with English translation) of corresponding Japanese Patent Application No. 2024-501621, dated Mar. 3, 2025, 8 pages.
Japan Patent Office, Search Report (with English translation) of corresponding Japanese Patent Application No. 2024-501621, dated Feb. 12, 2025, 2025, 30 pages.

LIGHT MODULE INCLUDING AN ELEMENT WITH VARIABLE LIGHT TRANSMISSION RATE

TECHNICAL FIELD

The present invention relates to the field of luminous devices for automotive vehicle. The invention particularly relates to a luminous module suitable for performing auxiliary functions. The invention more particularly relates to a luminous module that projects a light field onto the ground near the vehicle, in particular next to the doors.

BACKGROUND OF THE INVENTION

In order to improve the user experience of the vehicle, luminous modules with lighting toward the ground are installed in the rear-view mirrors or on the lateral flank of the vehicle, under the door sill. These luminous modules are arranged to project light onto the ground, which illuminates the area next to the doors. Generally, the illuminated area, forming a light field, extends longitudinally along the main axis of the vehicle.

These luminous modules can be switched on before the passengers and the driver enter the vehicle, and/or before they prepare to exit the vehicle. As a result, the passengers and the driver can see the state of the ground more clearly and see whether there are reliefs on the ground that might cause them to trip. The luminous modules described therefore increase user safety.

In addition, the luminous modules can comprise additional elements that make it possible to project a pattern onto the ground. This pattern is contained in the light field or itself forms the light field. The projected pattern can be an insignia of the make of vehicle, a logo or an aesthetic image. The element projected onto the ground contains information, for example information relating to the weather.

The luminous modules described can be connected to a control device. The luminous modules are thus switched on when the user starts the vehicle remotely and remain on until the user enters the vehicle. These luminous devices can therefore be used to establish a "welcome scenario", which increases the satisfaction of the vehicle user.

However, these luminous modules have the drawback of forming a light field the luminous intensity of which is not everywhere uniform.

SUMMARY OF THE INVENTION

The luminous modules described are often installed so as to project the light beam along an axis inclined downward with respect to the horizontal so that the light field can extend longitudinally toward the rear of the vehicle. Such projection results in a reduction in the luminous intensity of the light field as one moves away from the light source.

This defect is accentuated when the luminous module is placed at a low level, for example under the doors of the vehicle. In this case, the projection axis is further inclined and the projection angle is further reduced. The projection of the light beam thus becomes raking. As a result, the intensity of the light field on the ground decreases gradually as one moves away from the luminous module. In other words, the light field is divided into several sectors with different luminous intensity. The sectors near the luminous module are more intense than the sectors far away from the device.

The smaller the angle of projection, the more raking the projection becomes, and the more the proportion of dark sectors, or sectors with low luminous intensity, increases.

Furthermore, the different in brightness of the light field is even more noticeable when the light field is formed by a pattern.

In light of this problem, one objective of the invention is to design a luminous module capable of projecting onto the ground a light field with uniform luminous intensity.

With this objective in mind, a luminous module according to the invention comprises:
 a light source;
 a projection optic designed to project a light field onto the ground.

According to the invention, the luminous module further comprises an element with a variable light transmission rate positioned between the light source and the projection optic, said element with a variable light transmission rate comprising:
 a first portion receiving light rays suitable for forming a first sector of the light field;
 a second portion receiving light rays suitable for forming a second sector of the light field situated further away from the light source than the first sector.

In addition, the first portion has a light transmission rate, referred to as the first light transmission rate, that is lower than the light transmission rate of the second portion, referred to as the second light transmission rate.

Furthermore, the first light transmission rate and the second light transmission rate are defined so that the luminous intensity of the first sector is substantially equal to the luminous intensity of the second sector.

In other words, the light transmission rate varies within the proposed element, hence the name "element with a variable light transmission rate". Specifically, the first portion of the element with a variable light transmission rate is more opaque than the second portion of said element. The first portion lets through less light than the second portion. In addition, the degree of opacity of the first portion and the second portion is defined so that the luminous intensity of the first sector is reduced so as to reach the same luminous intensity as the second sector.

Thus, by incorporating the proposed luminous module into a luminous device as described above, the luminous intensity of two different sectors of the light field is therefore made uniform, despite their different positions with respect to the light source.

The light field thus obtained has the same luminous intensity over its entire extent, which improves the quality of the light field and satisfies the observer, in particular the user of the vehicle in which the luminous module is installed.

In the present document, the projection optic creates a real, and possibly anamorphic, image of a part of the module, for example the source itself, or of an intermediate image of the source, at a very large (finite or infinite) distance in comparison with the dimensions of the module (with a ratio of the order of at least 30, preferably 100). This projection optic can consist of one or more reflectors, or one or more lenses, or one or more light guides, or even a combination of these possibilities.

The light source can be a solid-state light source. The term "solid state" refers to the light emitted by solid-state electroluminescence, which uses semiconductors to convert electricity into light. In comparison with incandescent lighting, semiconductor lighting generates visible light with lower heat production and less energy dissipation. The generally low weight of a semiconductor electronic luminous device affords greater resistance to impacts and vibrations than brittle glass tubes/bulbs and long, thin filament wires. They are also not subject to filament evaporation, which can increase the service life of the luminous device. Some examples of these types of lighting comprise semiconductor light-emitting diodes (LEDs), organic light-emitting diodes (OLEDs), or polymer light-emitting diodes (PLEDs) as light sources instead of electrical filaments, plasma or gas.

The luminous module according to the invention can optionally have one or more of the following features:

- the luminous module comprises a slide placed between the light source and the projection optic that bears a pattern to be projected; in addition, the element with a variable light transmission rate is positioned on the slide;
- the slide comprises a first face oriented toward the projection optic and a second face oriented toward the light source, said first face being placed in a focal plane of the projection optic and comprising the pattern to be projected, the projection of which is contained in the light field; the sharpness of the projection of the pattern borne by the slide is thus improved; by way of example, the pattern can be an insignia, a logo, or an image of an object; the pattern can be produced using a photolithography or laser engraving process; in this case, the light field consists of elements distinguished from each other by means of different contrast between these elements;
- according to one exemplary embodiment, the slide is designed so that the projection of the pattern forms the light field;
- according to one example, the slide comprises a transparent support letting through all of the light rays that reach it without however diverting their path;
- the element with a variable light transmission rate is positioned on the first face of the slide; the element with a variable light transmission rate and the pattern are thus positioned on the same face of the slide; such a slide is quick and low-cost to manufacture, as the surface treatment is concentrated on a single face;
- the element with a variable light transmission rate is positioned on the second face of the slide; in other words, the element with a variable light transmission rate and the pattern are positioned on two different faces of the slide; as a result, the quality of the light field is further improved; as the element with a variable light transmission rate is not placed in the focal plane of the projection optic, the components forming part of this element appear blurred, or even do not appear at all, in the light field; the quality of the image projected on the ground is guaranteed as only the projection of the pattern is sharply visible;
- according to one example, the light field consists of the projected image of the light source; in this case, the luminous module is used to generate a uniform light spot making it possible to illuminate the vicinity of the vehicle;
- the element with a variable light transmission rate has a variable thickness; by way of example, this element is formed by a metal layer, in particular made from chromium; the light transmission rate is inversely proportional to the thickness; the greater the thickness, the lower the transmission rate;
- the element with a variable light transmission rate is formed by a layer comprising a plurality of elementary units, referred to as the layer with a variable light transmission rate, the elementary units being distributed so that the first portion has a higher density of elementary units than the density of elementary units of the second portion; in other words, said layer is organized into portions with different densities of elementary units; inspiration has thus been taken from the technique of dithering in the field of printing, in order to create more or less opaque portions letting through some of the light rays so as to reduce the luminous intensity of the desired sector, in particular of the sector that is situated near the light source;
- in one exemplary embodiment, the layer with a variable light transmission rate comprises a density of elementary units that varies progressively within each portion; this progressive variation continues from one portion to another; in other words, the layer with a variable light transmission rate comprises a density of elementary units that varies progressively over the whole layer; by way of example, the layer with a variable light transmission rate exhibits a gradual variation of the density of the elementary units in a given orientation (horizontal, vertical, diagonal) and in a given direction (top to bottom or vice versa, right to left or vice versa);
- by way of example, in each portion, the elementary units are evenly distributed; the elementary units are spaced apart from each other by the same distance;
- the elementary units are completely opaque;
- the elementary units are made from metal; for example, they can be made from chromium or aluminum;
- the size of each elementary unit is of the order of a few micrometers, for example in the region of three micrometers;
- the elementary units are identical; it is a simple, practical configuration to produce;
- the layer with a variable light transmission rate is obtained using a photolithography process; it is a precise, flexible manufacturing method that can be adapted to different ways of distributing the elementary units;
- the element with a variable light transmission rate further comprises a transparent third portion, said third portion receiving light rays suitable for forming a third sector of the light field that is situated furthest away from the light source; when the element with a variable light transmission rate is made up of a layer provided with elementary units, the third portion is not provided with elementary units;
- according to one example, the second portion is positioned between the first portion and the third portion; the opacity thus decreases from the first portion to the third portion; consequently, the luminous intensity of the first sector decreases so as to reach the luminous intensity of the third sector, which is situated furthest away from the source;
- the luminous module is arranged so that the projection axis of the light beam coming from said module is inclined downward with respect to the horizontal; the intersection between the light beam and the ground thus forms the light field; here, the horizontal is given to mean an axis parallel to the surface of the ground on which the vehicle is standing;
- the projection optic comprises a plurality of lenses, the lenses being stacked on top of each other, for example, so as to form a single block.

Another object of the invention relates to a luminous device for automotive vehicle comprising a luminous module according to the invention.

Optionally, the luminous device is installed under a door of the vehicle, in particular the front door.

In another example, the luminous device is installed in a rear-view mirror of the vehicle.

BRIEF DESCRIPTION OF DRAWINGS

Further innovative features and advantages will become apparent from the following description, which is given by way of non-limiting indication, with reference to the appended drawings, in which.

DETAILED DESCRIPTION OF THE INVENTION

Figure 1:
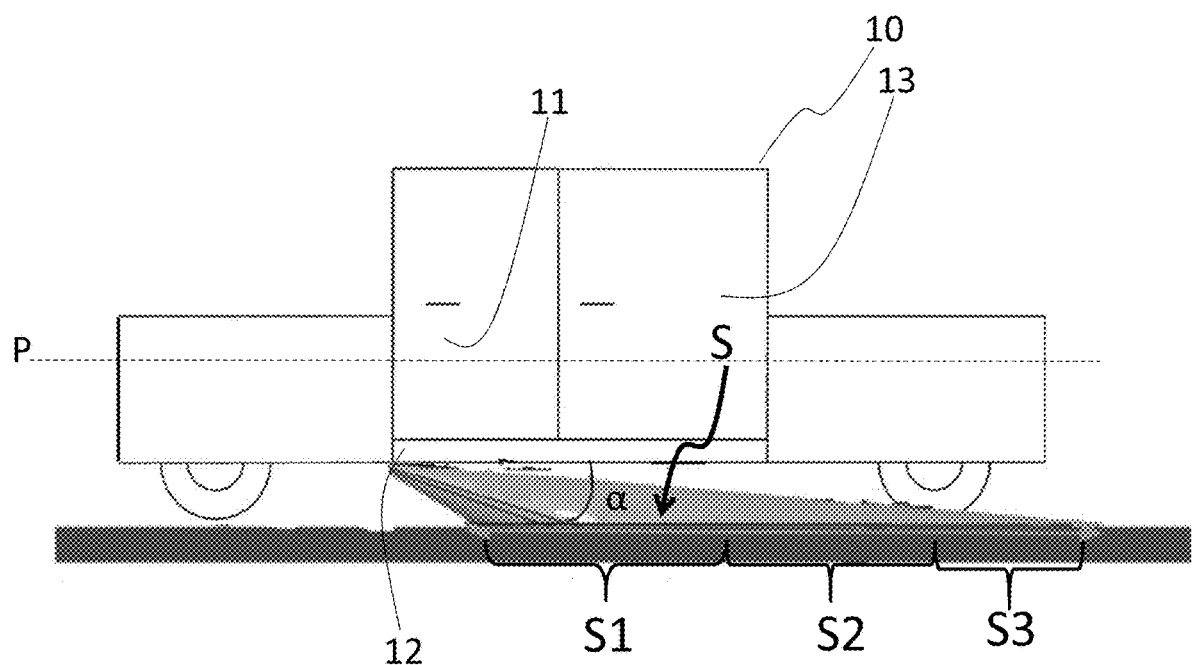
FIG. 1 shows a side view of an automotive vehicle comprising a luminous module according to one exemplary embodiment of the invention.

With reference to these figures, in particular FIG. 1, an automotive vehicle 10 comprises, on the left-hand side illustrated, a front door 11 and a rear door 13. A luminous device comprising a luminous module 1 (not visible in FIG. 1) is installed in a door sill 12 situated under the front door 11 and rear door 13. In the example illustrated, the luminous device is situated at the front end of the door sill 12 and is arranged to project onto the ground a light field S that extends parallel to the main axis P of the vehicle 10. The projection axis forms an angle α with a horizontal axis.

The luminous device acts as a lateral means for lighting the space situated next to the front and rear entrance doors.

Here, the light field S extends to the rear of the vehicle 10. In the prior art, the light field has a variable luminous intensity, which sometimes makes the difference in luminous intensity between the different sectors of this light field visible, that is, sectors that are darker than others can be distinguished.

Given that the luminous device comprises the luminous module 1 produced according to the principle of the invention, the light field S has a uniform luminous intensity over its entire extent. In other words, the light field S is not divided into several sectors with different luminous intensity, but consists here of a single sector with the same luminous intensity everywhere.

The quality of the light field is thus improved. To achieve this, the luminous device comprises the luminous module 1 as illustrated schematically in FIGS. 2 to 6.

Figure 2:
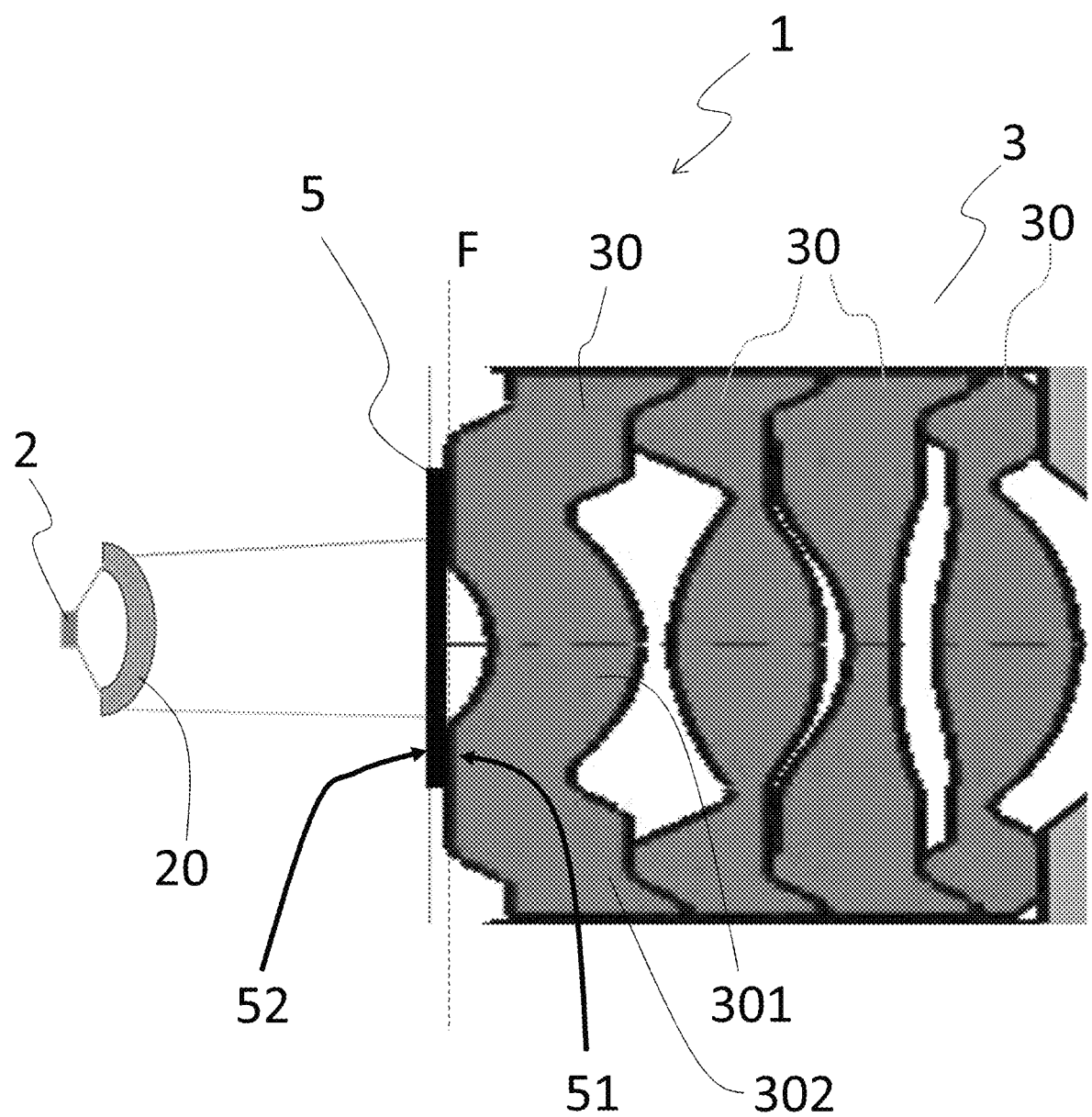
FIG. 2 shows a cross-sectional view of the luminous module in FIG. 1.

In FIG. 2, the luminous module 1 comprises a light source 2, a projection optic 3 and a slide 5 positioned between the light source 2 and the projection optic 3.

Here, the light source 2 is an LED (light-emitting diode). Other types of light source can be envisaged. The light source 2 can comprise one or more LEDs. Here, a collimator 20 is placed in front of the light source 2 in order to produce a beam resulting from parallel rays oriented in the direction of the slide 5 and the projection optic 3.

In the example illustrated, the projection optic 3 has a focal plane F and is made up of a plurality of lenses 30 that are stacked on top of each other. There are four lenses here.

Each of the lenses 30 comprises a central part 301 with dioptric surfaces and an outer ring 302 surrounding the central part 301. The dioptric surfaces are configured to project the rays coming from the light source 2 while limiting, or even eliminating, optical aberrations such as distortion.

The outer ring 302 is provided with engagement means suitable for interacting with complementary engagement means of the outer ring of the adjacent lens. By way of example, engagement means can comprise a groove or a rib.

In order to guarantee that all of the lenses 30 are held satisfactorily, they are placed in a lens holder (not illustrated in FIG. 2) that grips the two opposite ends of the assembly. To this end, the lens holder comprises edges that press on the outer ring of the first lens and the last lens in the assembly.

Here, the slide 5 is a transparent plate 53 having, by way of illustration, a rectangular cross-section. The slide 5 can be made from glass or plastic, for example polyethylene terephthalate (PET). The slide 3 has a first face 51 and a second face 52. The slide is placed in the luminous module 1 so that the first face 51 is oriented toward the projection optic 3 and so that the second face 52 is oriented toward the light source 2. The first face 51 is also known as the downstream face and the second face 52 is also known as the upstream face. The terms "upstream" and "downstream" are defined in the direction of propagation of light in the luminous module 1.

Figure 3:
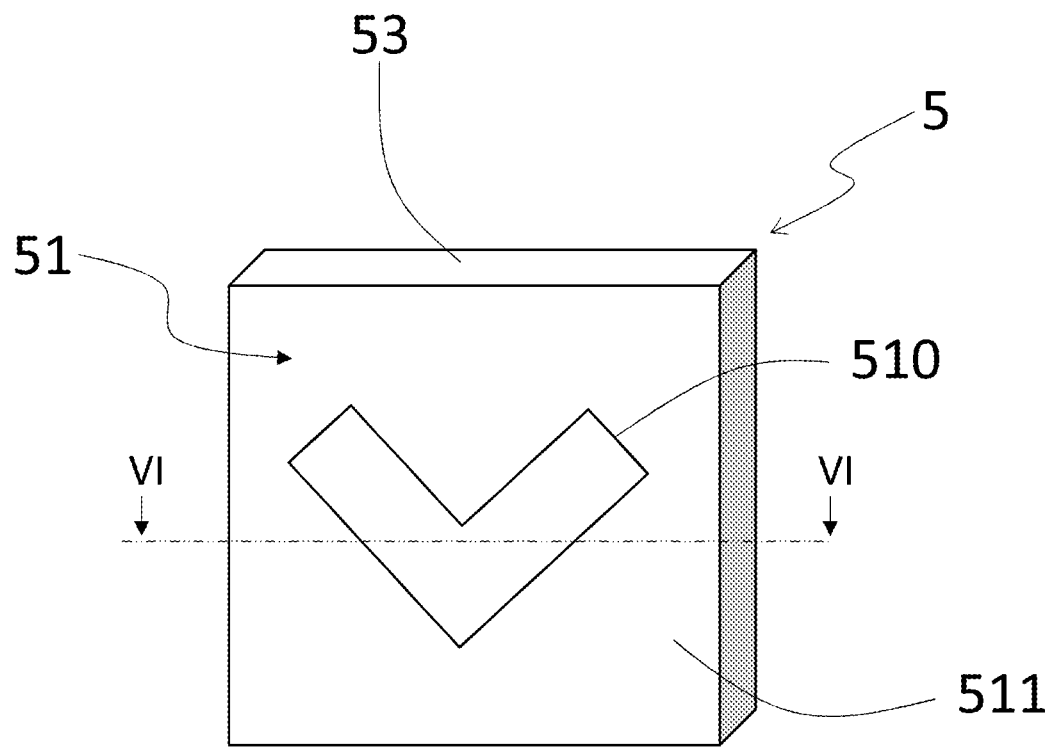
FIG. 3 shows a schematic perspective view of a first face of the slide forming part of the luminous module in FIG. 1.

As illustrated on FIG. 3, a pattern 510 is produced on the first face 51 of the slide 5. The pattern 510 will be projected onto the ground and thus forms the light field S. In this example, the pattern 510 is the letter "V".

The pattern 510 is obtained by a process for treating the surface of the first face 51. This is for example a photolithography process that creates a transparent zone 510 and an opaque zone 511 on the first face 51. The opaque zone 511 is covered with an opaque layer 513 (visible in FIG. 6) that does not let the light through, in particular a layer of chromium oxide. The opaque layer 513 can be made from other materials, such as aluminum or silver. In the transparent zone 510, the first face 51 remains uncovered, that is, the first face 51 is not covered with material. The light rays can therefore pass through the transparent zone 510 to reach the projection optic 3. The transparent zone therefore forms the pattern 510 to be projected. The first face 51 is placed in the focal plane F of the projection optic 3 so that the image of the pattern is projected infinitely, and is therefore sharp on the projection surface.

In another example, the transparent zone can be covered by a transparent layer that lets through all of the light rays that reach it.

Figure 4:
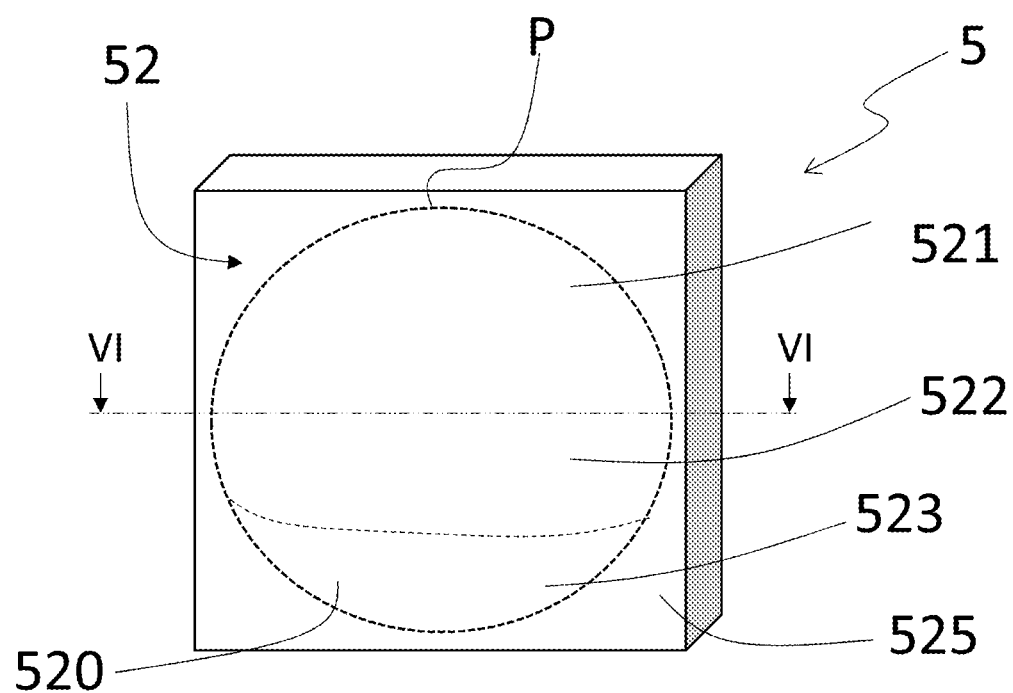
FIG. 4 shows a schematic perspective view of a second face of the slide forming part of the luminous module in FIG. 1.
Figure 5:
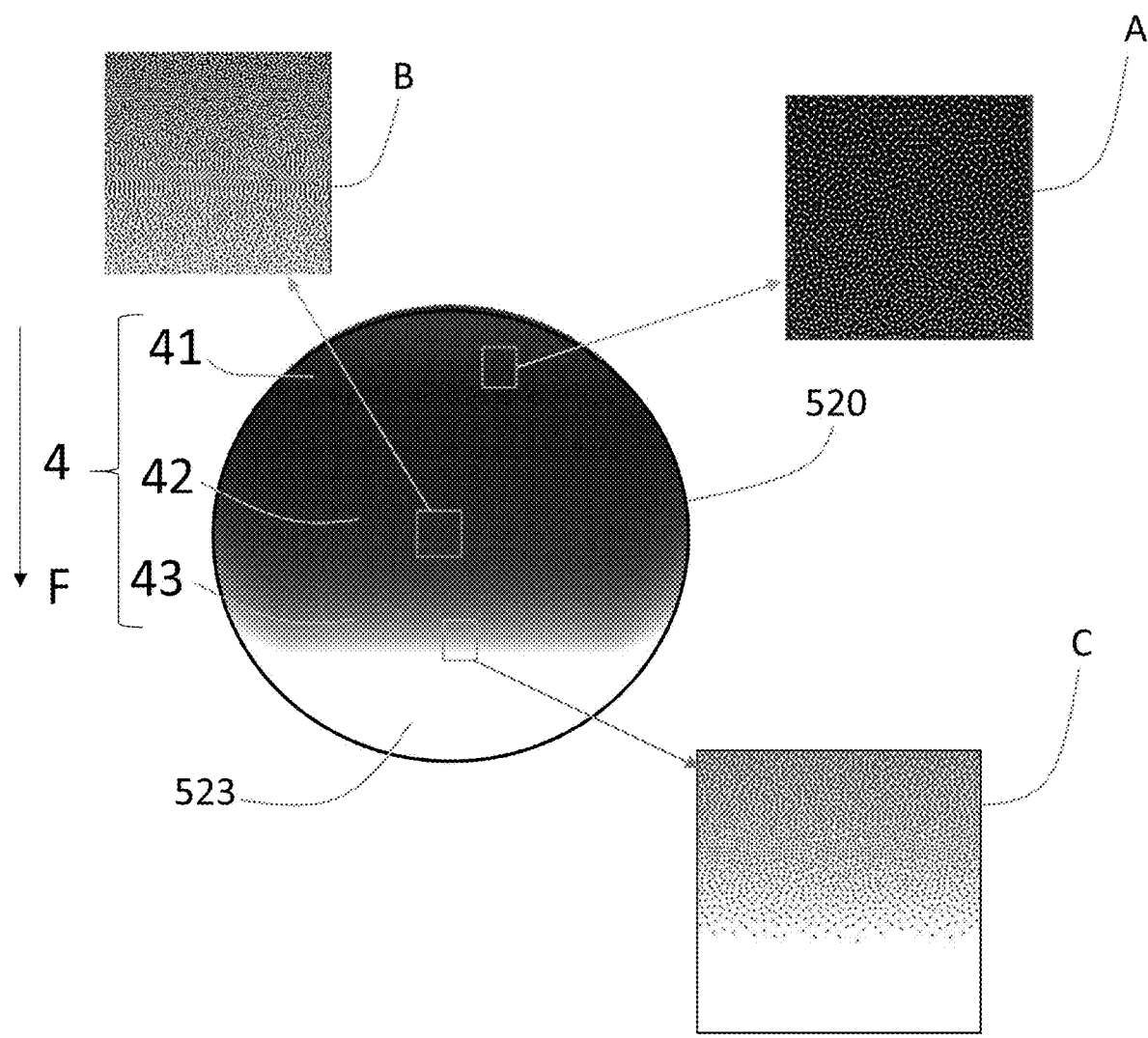
FIG. 5 shows a rear view of the device in FIG. 3, accompanied by detailed views A, B, and C.

FIGS. 4 and 5 show the second face 52 of the slide 5. According to the invention and as in this example, an element with a variable light transmission rate 4 is positioned on the second face 52. Here, the element with a variable light transmission rate 4 extends in a zone 520 delimited by a circle P illustrated in FIG. 4. The zone 520 is also known as the active zone 520, as it is placed facing the pattern 510 on the first face 51. In other words, the active zone 520 receives the light rays, which then reach the pattern 510.

The rest of the second face 52, which is not placed facing the pattern 510, is known as the inactive zone 525. An opaque coating layer is deposited on this inactive zone 521 to prevent any stray rays that might reach the projection optic 3 and would thus be imaged in the light field S. This opaque coating layer can be of the same type as the opaque layer 513 deposited on the first face 51.

Here, the element with a variable light transmission rate is formed by a layer of material 4 comprising a plurality of elementary units 400 spaced apart from each other.

The distance between one elementary unit 400 and neighboring units can be varied within the layer of material 4.

As illustrated in FIG. 5, the layer of material 4 comprises a density of elementary units that decreases from top to bottom in FIG. 5, represented by the arrow F. For example, the density of elementary units decreases continuously from top to bottom. This decrease can be linear or non-linear. Described otherwise, the layer of material 4 can be divided into a plurality of portions that follow on from each other in the direction of extension of the layer of material, here shown by the arrow F. Each portion can have a very small dimension and can comprise a defined density of elementary units. Any given portion has a density of elementary units greater than the portion situated immediately below.

Here, the layer of material 4 extends partially in the active zone 520 of the second face 52 of the slide 5. Here, the elementary units are positioned on part of the active zone 520 with a decreasing density from top to bottom in this part. The remaining part of the active zone 520 is not provided with elementary units. This remaining part is also known as the zone not covered by the layer of material 4 and is denoted 523 in FIGS. 4 and 5.

By way of example, the distribution of the elementary units in an upper portion 41 of the layer of material 4 is illustrated in the enlarged view denoted "A" in FIG. 5. The distribution of the elementary units in a middle portion 42 of the layer of material 4 is illustrated in the enlarged view denoted "B" in FIG. 5. It will be noted that the density of the elementary units is higher in the upper zone 41 than in the middle zone 42. Another enlarged view denoted "C" in FIG. 5 illustrates the distribution of the elementary units in a lower portion 43 with a density that decreases gradually up to the zone 523 not covered by the layer of material 4.

In another exemplary embodiment, the elementary units can be positioned with a variable density over the entire surface of the active zone 520 of the second face 52. In this case, the zone 523 will be covered by a lower density of elementary units.

According to another exemplary embodiment, the elementary units can be distributed in several groups with constant density, and the density is different from one group to another. In this case, the arrangement of these groups with respect to each other depends on how the luminous module is installed in the vehicle, for example for projection that is non-raking or perpendicular to the ground. In addition, the distribution by group of elementary units with constant density can be suitable for patterns with surfaces with particularly contrasting luminance.

Figure 6:
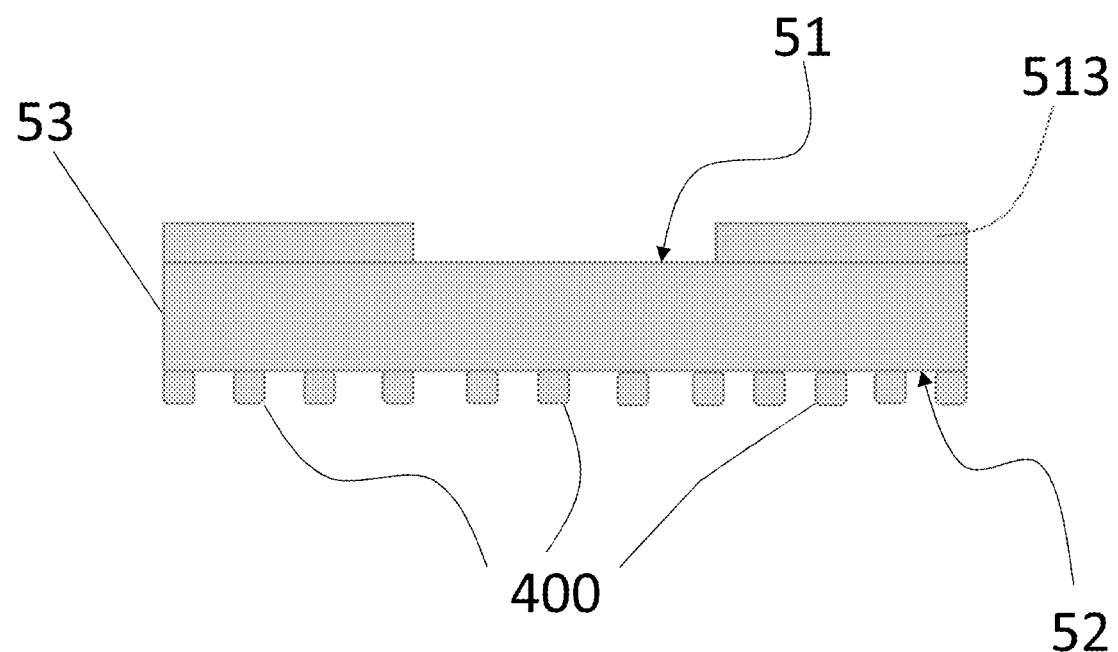
FIG. 6 shows a transverse cross-sectional view of the slide along a plane passing through the line VI-VI illustrated in FIG. 3 and FIG. 4.

Returning to the example illustrated, it will be observed in FIG. 6 that the elementary units 400 are the same size, which makes it possible for the layer of material 4 to have a constant thickness. In addition, the layer of material 4 with identical elementary units is simple to produce.

The elementary units 400 are produced from an opaque material. Here, the elementary units 400 are made from metal, for example, chromium or aluminum. Optionally, the elementary units 400 can be made from the same material as the layer covering the inactive zone 525.

With their opaque body, each elementary unit prevents the light rays that reach it from passing through it. In addition to the above, the elementary units 400 can be a dark color, or even black.

The presence of the elementary units 400 on the second face 52 of the slide reduces the quantity of light rays that can reach the second face 52 and pass through the body 53 to arrive at the first face 51. In other words, the elementary units 400 have an impact on the transparency of the slide. The more elementary units 400 there are, the more opaque the part of the slide concerned becomes. The degree of opacity of this part is linked to the density of the elementary units 400 that are present thereon.

The layer 4 containing the elementary units 400 described above is known as the layer with a variable light transmission rate, as it modifies the degree of opacity of the slide, in a manner that changes on the second face 52. The part of the second face 52 that is covered by the layer 4 has an opacity that varies in proportion to the density of elementary units of this layer 4. The upper part 521 of the active zone 520 is more opaque than the middle part 522 of the same zone. Finally, the zone 523 that is not provided with elementary units 400 retains its initial transparency.

Bearing the layer with a variable transmission rate 4 as described, the slide 5 is arranged in the luminous module 1 so that the light rays reaching the upper part 521 and the middle part are the rays suitable for forming the sectors of the light field S that are near the light source. These sectors are denoted S1 and S2 in FIG. 1. In parallel, the light rays that reach the zone 523 contribute to forming the sector of the light field that is furthest away from the light source. This sector is denoted S3 in FIG. 1.

As a result, the luminous intensity is the same throughout the light field S, as the quantity of light forming the first and second sectors S1 and S2 is reduced to the same level as the quantity of light forming the third sector S3. This reduction originates from the presence of the elementary units 400 on the parts 521 and 522 of the second face 52, which prevents some of the light from passing through the slide 5.

The layer with a variable light transmission rate therefore makes it possible to remedy the uneven light distribution of the light field in the prior art. In the prior art, the sector that is situated nearest to the luminous module, and therefore to the light source, has greater luminous intensity than the sector that is situated a little further away from the source. Due to the layer with a variable light transmission rate, the luminous intensity of the first sector, which is more illuminated, is reduced so as to reach the same luminous intensity as the second sector, which is situated further away from the light source and is therefore less illuminated.

Of course, the present invention is not limited to the example described above. Various modifications can be made to the example described without departing from the scope of the invention.

For example, the pattern produced on the first face of the slide can be different. The number of portions of the layer with a variable light transmission rate and therefore the number of parts into which the second face is divided can be different. Other materials and other processes can be envisaged for producing the layer with a variable light transmission rate.

What is claimed is:

1. A luminous module for automotive vehicle comprising:
   a light source;
   a projection optic designed to project a light field onto the ground;
   a slide placed between the light source and the projection optic that bears a pattern to be projected;
   an element with a variable light transmission rate positioned on the slide between the light source and the projection optic, the element with a variable light transmission rate including:
a first portion receiving light rays suitable for forming a first sector of the light field;
a second portion receiving light rays suitable for forming a second sector of the light field, the second sector being situated further away from the light source than the first sector; and
the first portion having a light transmission rate, referred to as the first light transmission rate, that is lower than the light transmission rate of the second portion, referred to as the second light transmission rate; and
the first light transmission rate and the second light transmission rate being defined so that the luminous intensity of the first sector is substantially equal to the luminous intensity of the second sector.

2. The luminous module as claimed in claim 1, wherein the slide includes a first face oriented toward the projection optic and a second face oriented toward the light source, the first face being placed in a focal plane of the projection optic and including the pattern to be projected, the projection of which is contained in the light field or forms the light field.

3. The luminous module as claimed in claim 2, wherein the element with a variable light transmission rate is positioned on the first face of the slide.

4. The luminous module as claimed in claim 2, wherein the element with a variable light transmission rate is positioned on the second face of the slide.

5. The luminous module as claimed in claim 1, wherein the light field consists of the projected image of the light source.

6. The luminous module as claimed in claim 1, wherein the element with a variable light transmission rate has a variable thickness.

7. The luminous module as claimed in claim 1, wherein the element with a variable light transmission rate is formed by a layer including a plurality of elementary units, known as the layer with a variable light transmission rate, the elementary units being distributed so that the first portion has a higher density of elementary units than the density of elementary units of the second portion.

8. The luminous module as claimed in claim 7, wherein the elementary units are completely opaque.

9. The luminous module as claimed in claim 7, wherein the elementary units are made from metal.

10. The luminous module as claimed in claim 7, wherein the layer with a variable light transmission rate is obtained by a photolithography process.

11. The luminous module as claimed in claim 1, wherein the element with a variable light transmission rate includes a transparent third portion, the third portion receiving light rays suitable for forming a third sector of the light field that is situated furthest away from the light source.

12. The luminous module as claimed in claim 11, wherein the second portion is positioned between the first portion and the third portion.

13. The luminous module as claimed in claim 1, wherein the projection optic includes a plurality of lenses, the lenses being stacked on top of each other.

14. A luminous module for automotive vehicle comprising:
a light source;
a projection optic designed to project a light field onto the ground;
an element with a variable light transmission rate positioned between the light source and the projection optic and formed by a layer including a plurality of elementary units, the element with a variable light transmission rate including:
a first portion receiving light rays suitable for forming a first sector of the light field;
a second portion receiving light rays suitable for forming a second sector of the light field, the second sector being situated further away from the light source than the first sector; and
the first portion having a light transmission rate, referred to as the first light transmission rate, that is lower than the light transmission rate of the second portion, referred to as the second light transmission rate; and
the first light transmission rate and the second light transmission rate being defined so that the luminous intensity of the first sector is substantially equal to the luminous intensity of the second sector, with the elementary units being distributed so that the first portion has a higher density of elementary units than the density of elementary units of the second portion.

15. The luminous module as claimed in claim 14, wherein the elementary units are completely opaque.

16. The luminous module as claimed in claim 14, wherein the elementary units are made from metal.

17. The luminous module as claimed in claim 14, wherein the layer with a variable light transmission rate is obtained by a photolithography process.

18. The luminous module as claimed in claim 14, wherein the element with a variable light transmission rate includes a transparent third portion, the third portion receiving light rays suitable for forming a third sector of the light field that is situated furthest away from the light source.

19. The luminous module as claimed in claim 18, wherein the second portion is positioned between the first portion and the third portion.

20. The luminous module as claimed in claim 14, wherein the projection optic includes a plurality of lenses, the lenses being stacked on top of each other.

* * * * *